United States Patent [19]

Sato et al.

[11] 4,360,224
[45] Nov. 23, 1982

[54] TRICYCLE WITH TWO FORE WHEELS

[75] Inventors: Toshiyuki Sato; Nobuyuki Kanno, both of Iwata, Japan

[73] Assignee: Yamaha Hatsudoki Kabushiki Kaisha, Iwata, Japan

[21] Appl. No.: 209,026

[22] Filed: Nov. 21, 1980

Related U.S. Application Data

[63] Continuation of Ser. No. 54,868, Jul. 5, 1979, abandoned, which is a continuation of Ser. No. 825,723, Aug. 18, 1977, abandoned.

[30] Foreign Application Priority Data

Aug. 24, 1976 [JP] Japan .............................. 51-100227

[51] Int. Cl.³ ............................................ B62D 61/06
[52] U.S. Cl. .................................. 280/772; 180/210; 280/269; 280/282; 280/112 A; 280/716
[58] Field of Search ............... 280/772, 662, 664, 665, 280/692, 695, 697, 700, 715, 716, 717, 721, 267, 268, 269, 112 A, 112 R, 282; 180/210

[56] References Cited

U.S. PATENT DOCUMENTS

| 2,152,938 | 4/1939 | Welch | 280/112 A |
| 2,493,817 | 1/1950 | Hare | 180/210 |
| 2,791,440 | 5/1957 | Guidobaldi | 280/112 A |
| 2,978,255 | 4/1961 | Rosenkrands | 280/112 A |
| 3,572,456 | 3/1971 | Healy | 280/112 A |
| 3,704,897 | 12/1972 | Bagge | 280/112 A |
| 3,746,118 | 7/1973 | Altorfer | 280/112 A |
| 3,958,814 | 5/1976 | Smith | 280/269 |
| 4,020,914 | 5/1977 | Trautwein | 280/112 A |

FOREIGN PATENT DOCUMENTS

2502529 8/1975 Fed. Rep. of Germany ...... 180/210

*Primary Examiner*—John P. Silverstrim
*Attorney, Agent, or Firm*—Donald D. Mon

[57] ABSTRACT

A tricycle having two spaced fore wheels and a single rear wheel connected to a frame structure. The fore wheels are connected to the frame by a longitudinally extending shaft. A double wishbone suspension comprised of a pair of upper arms and a pair of lower arms connected by vertical links at their outer ends join the fore wheels to the frame and longitudinal shaft. The upper arms are pivotally connected to the frame while the lower arms are pivotally and separately connected to the longitudinal shaft by a shock absorbing cushion.

8 Claims, 12 Drawing Figures

TRICYCLE WITH TWO FORE WHEELS

BACKGROUND OF THE INVENTION

This invention relates to a tricycle, more particularly a tricycle having two fore wheels.

Since a tricycle has a better stability in low speed running or at standstill than a bicycle its demand has been increased in recent years. Among tricycles there are a first type having two rear wheels and one fore wheel and a second type having two fore wheels and one rear wheel. The former type is disclosed in U.S. Pat. No. 3,572,456, for example, and is advantageous in that its steering characteristic is excellent due to the fact that the load on the front wheel is small but disadvantageous in that the rear wheels may hit the rider's feet. To solve this problem it is necessary to take into consideration the arrangement of the wheels, load, the position of the center of gravity, the tire characteristic and their mutual relationships.

The second type is disclosed in U.S. Pat. Nos. 2,493,817 and 3,746,118, for example. Contrary to the first type, with this type the steering characteristic is inferior because of the large load on the fore wheels, but riding is easy as in an oridnary bicycle because of a single rear wheel.

The invention contemplates improvement of the tricycle of the second type while preserving the advantage of the first type. Recent requirements for the tricycle of the second type involves easiness of steering, capability of running along narrow roads, and occupation of small area while at standstill. To fullfil these requirements, efforts are now being made to develop a tricycle having a relatively small distance between two fore wheels. However, decrease in the wheel distance results in a great decrease in the running stability, one of the features of the tricycle of this type. Especially, the running stability is important at the time of running along a curve, and in an extreme case, the wheel closer to the center of the curve floats upwardly, thus causing tumbling down.

SUMMARY OF THE INVENTION

Accordingly, the principal object of this invention is to provide an improved tricycle having two fore wheels and better running stability than the prior art tricycles of this type.

Another object of this invention is to provide a tricycle of the type having two fore wheels and capable of inclining the frame structure and all wheels toward the center of a curve when running along the curve.

Still another object of this invention is to provide an improved tricycle of the type including two fore wheels capable of maintaining upright the frame structure at the time of standstill and while running at low speeds.

According to this invention, these and further objects can be accomplished by providing a tricycle comprising two fore wheels, a single rear wheel, a shaft member extending in the longitudinal direction of the tricycle between the fore wheels and horizontally secured to the frame structure of the tricycle, left and righthand lower arms having one ends adapted to support the fore wheels respectively and the other ends connected to the shaft means through a shock absorbing or damper mechanism, and left and righthand upper arms having one ends adapted to support the fore wheels respectively and the other ends pivotally connected to the frame structure.

According to one embodiment of this invention, corresponding outer ends of the upper and lower arms are interconnected by a pair of substantially parallel links to form a suspension mechanism of the double wishbone type and buckles respectively supporting the fore wheels are secured to respective buckles which are arranged to be rotated by a steering handle through tie rods.

The shaft means comprises a hollow shaft secured to the frame structure and a torsion bar extends through the hollow shaft with one end connected to one end of the hollow shaft. Inner and outer cylinders are rotatably mounted near the other end of the hollow shaft and a resilient means interposed between the inner and outer cylinders. The inner ends of the left and righthand lower arms are connected respectively to the outer and inner cylinders and the other end of the torsion bar is connected to the outer cylinder.

According to a modified embodiment of this invention the fore wheels are suspended by a double wishbone type suspension mechanism and a shock absorbing or damper device. Thus, a pair of L shaped lower arms are rotatably mounted on a hollow shaft by ring shaped members and a pair of upper arms are provided with their inner ends pivotally mounted on the frame structure. The outer ends of the upper arms and the outer ends of the lower arms are interconnected by a pair of substantially parallel vertical links to which buckles supporting the fore wheels are secured. Compression spring type damper devices are connected between the vertical lever of one lower arm and the horizontal lever of the other lower arm. A torsion bar is contained in the hollow shaft with one end connected thereto. The other end of the torsion bar is connected to the vertical and horizontal levers of one lower arm through an L shaped member.

DESCRIPTION OF THE PREFERRED EMBODIMENTS

Figure 1:
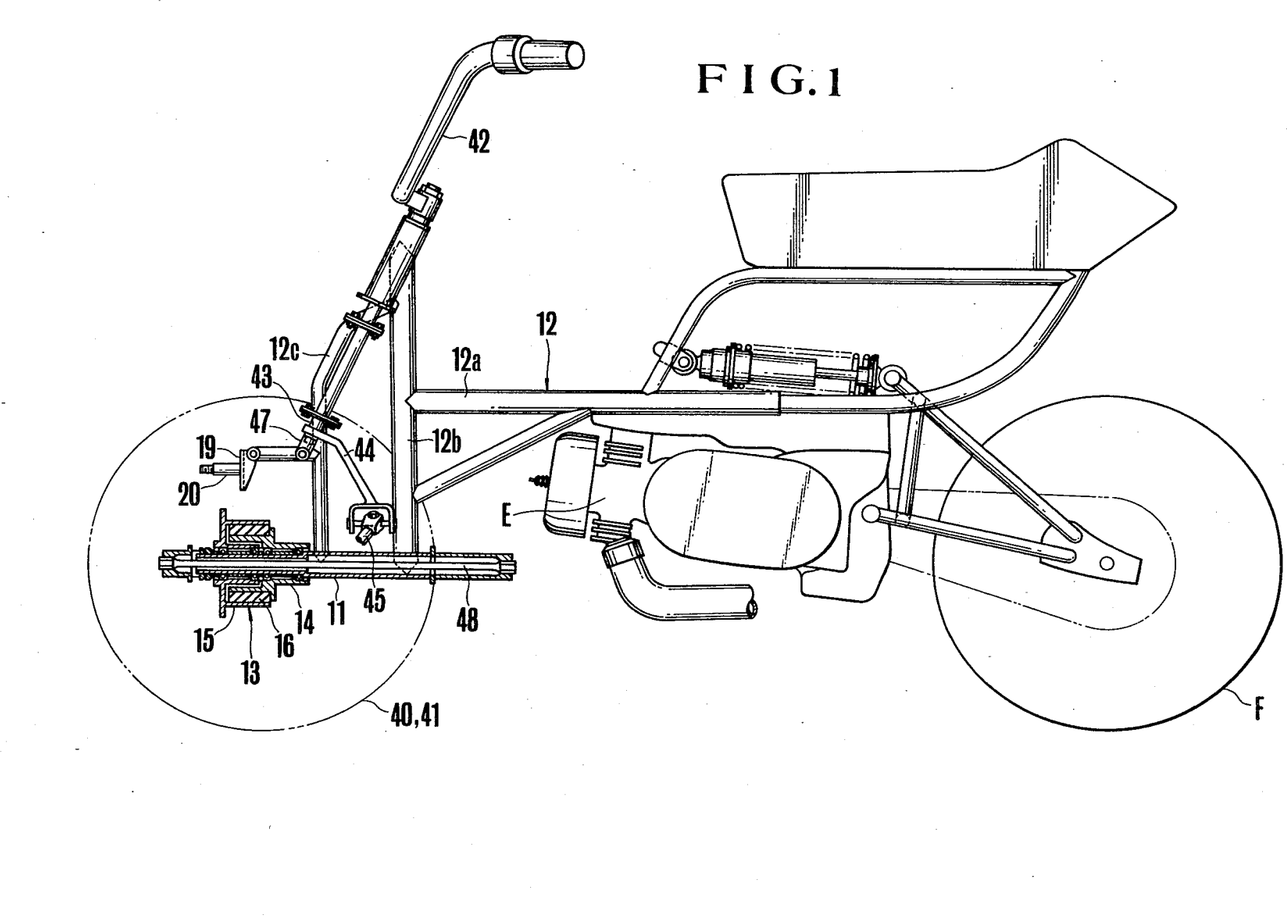
FIG. 1 is a side view, partly in section, showing one embodiment of a tricycle of the type including two fore wheels.
Figure 2:
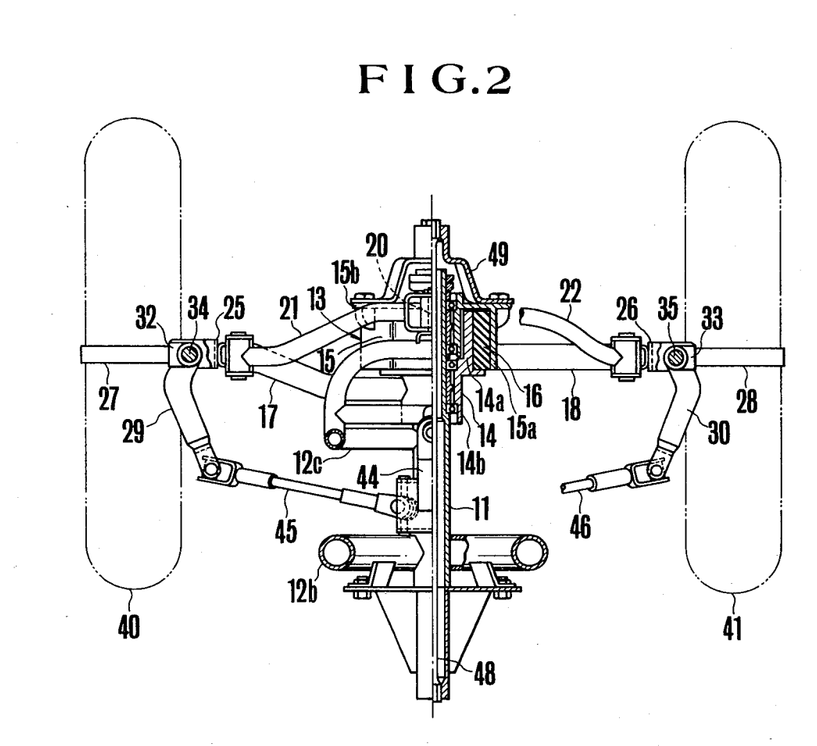
FIG. 2 is a plan view, partly in section, showing the suspension mechanism utilized in the tricycle shown in FIG. 1.
Figure 3:
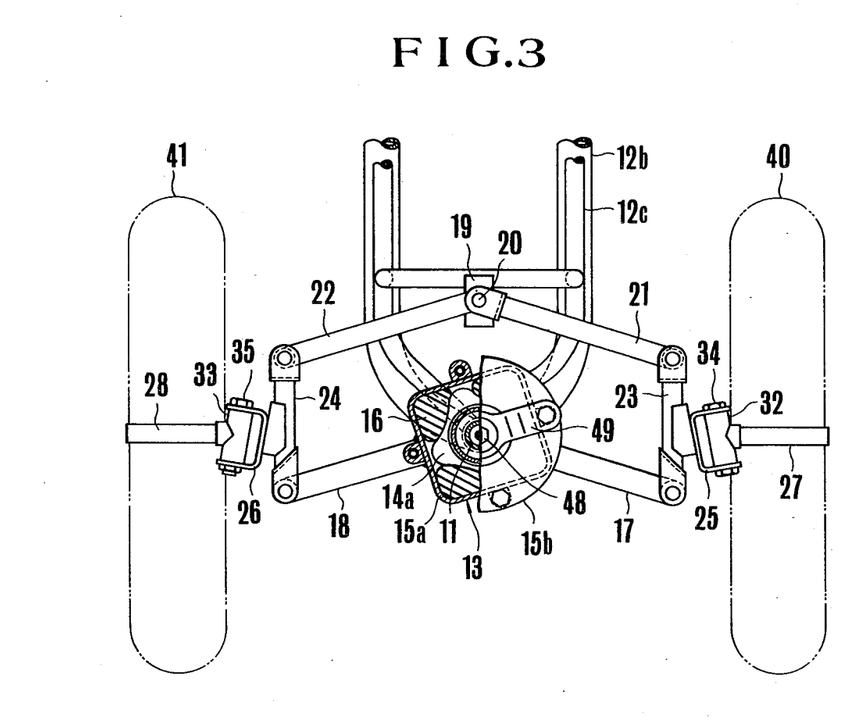
FIG. 3 is a front view, partly in section, also showing the suspension mechanism.

A preferred embodiment of the tricycle shown in FIGS. 1 through 6 is of the type wherein two fore wheels are supported by a so-called wishbone type suspension mechanism, a pair of left and righthand lower arms are connected respectively to the inner and outer cylinders of a neidhart cushion, and one ends of the left and right hand upper arms are pivotally connected to the frame structure. The tricycle shown in FIGS. 1 through 6 comprises a hollow shaft 11 secured by stays 12b and 12c to a main frame 12a comprising the frame structure 12. A single rear wheel F is connected to the rear end of the frame structure 12 as shown in FIG. 1. The hollow shaft 11 is located at the center between two fore wheels 40 and 41 and extends in the horizontal direction of the tricycle. The shock absorbing or neidhart cushion 13 comprises an inner cylinder 14 and an outer cylinder 15 rotatably mounted on the hollow shaft 11. The inner cylinder 14 comprises a substantially square portion 14a and an axially extending portion 14b integral therewith while the outer cylinder 15 comprises a square portion 15a encircling the square portion 14a and an integral flange 15b. 1 A resilient means 16 is contained in a space between square portions 14a and 15a. There is provided a pair of lower arms 17 and 18, one end of the former being secured to the axial extending portion 14b of the inner cylinder 14, whereas one end of the latter to the outer wall of the square portion 15a of the outer cylinder 15. One ends of a pair of upper arms 21 and 22 are pivotally connected to a pivot shaft 20 supported by a bracket 19 which is secured to the frame structure 12 through a stay 12c. The outer ends of the upper and lower arms 21, 22 and 17 and 18 are interconnected by links 23 and 24 which are moved in the vertical direction as the inner and outer cylinders 14 and 15 rotate. Knuckles 25 and 26 are secured to the intermediate points of the links 23 and 24 for rotatably supporting knuckle shafts 32 and 33 including fore wheel shafts 27 and 28 and knuckle arms 29 and 30, respectively, through king pins 34 and 35. Thus, the upper arms 21 and 22, the lower arms 17 and 18 and links 23 and 24 constitute a double wishbone type suspension mechanism and the weight of the tricycle is resiliently supported by the neidhart cushion 13.

Figure 4:
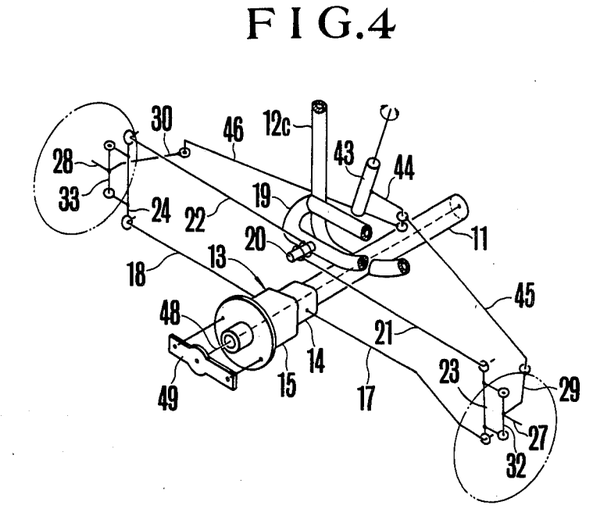
FIG. 4 is a diagram useful to explain the construction and operation of the suspension mechanism utilized in the tricycle shown in FIGS. 1 to 3.

A handle post 43 is rotated by a steering handle 42 and provided at its lower end with a steering arm 44 which is connected with the knuckle arms 29 and 30 respectively through tie rods 45 and 46 as best shown in FIG. 4. The handle post 43 is rotatably supported by a bearing 47 which is secured to the frame structure 12 together with the bracket 19 via the stay 12c.

A torsion bar 48 is provided with its opposite ends connected to the frame structure 12 and the righthand lower arm 18, respectively. Thus, one end of the torsion bar 48 is secured to the rear end of the hollow shaft 11, hence to the frame structure 12 while the other end is secured to the outer cylinder 5 of the neidhart cushion 13 through a coupling member 49. The torsion bar 48 maintains the frame structure 12 upright when running straight and enables the frame structure to bank at the rider's will when turning at a curve. The torsion bar 48 also improves stability in a low speed running. Further the torsion bar operates to bring the frame structure upright when standstill.

Figure 5:
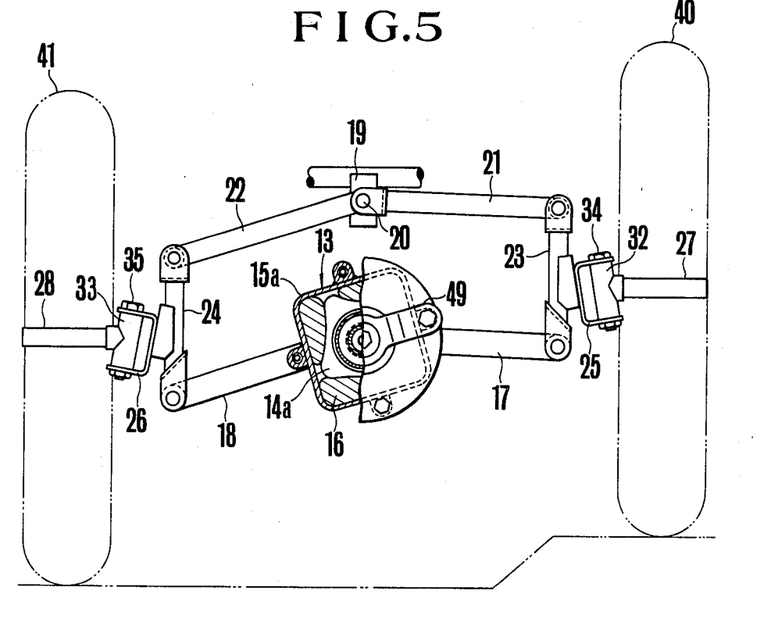
FIG. 5 is a front view similar to FIG. 2 showing a state wherein one of the fore wheels rides on a raised portion.

When the tricycle runs on a road having an irregular surface, that is, when the lefthand fore wheel 40 rides on a higher surface whereas the righthand fore wheel 41 rides on a lower surface as shown in FIG. 5, the lefthand lower arm 17 rotates in the counter clockwise direction against the force of the resilient means 16 of the neidhart cushion 13, thus raising the lefthand link 23 parallel to the righthand link 24. Consequently, the tricycle runs while holding both the fore wheels 40 and 41 and the frame structure 12 in the vertical position without inclination.

Figure 6:
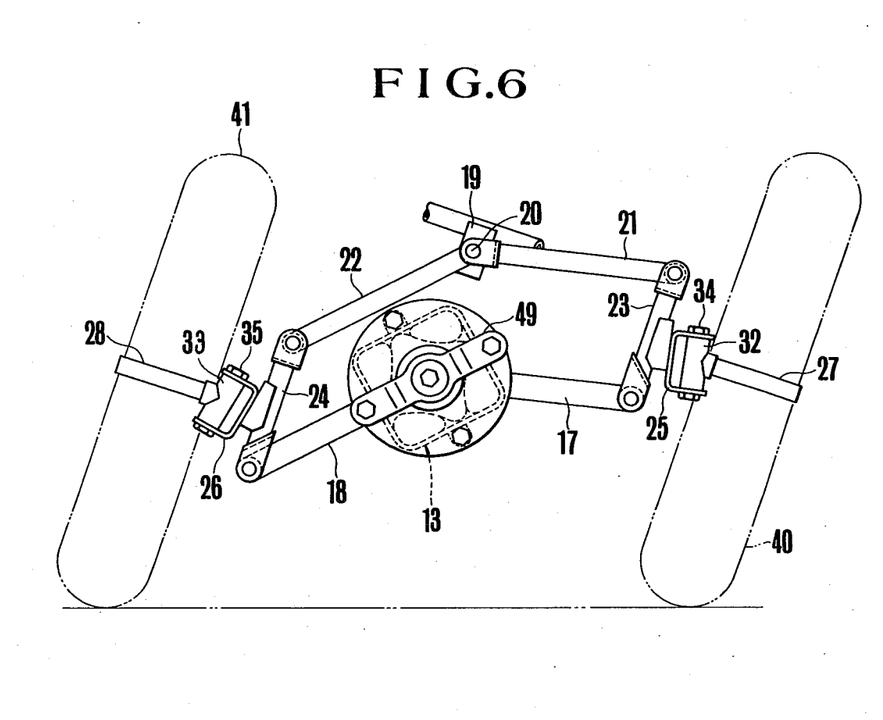
FIG. 6 is a front view useful to explain the operation of the tricycle of this invention when it runs along a curve.
Figure 7:
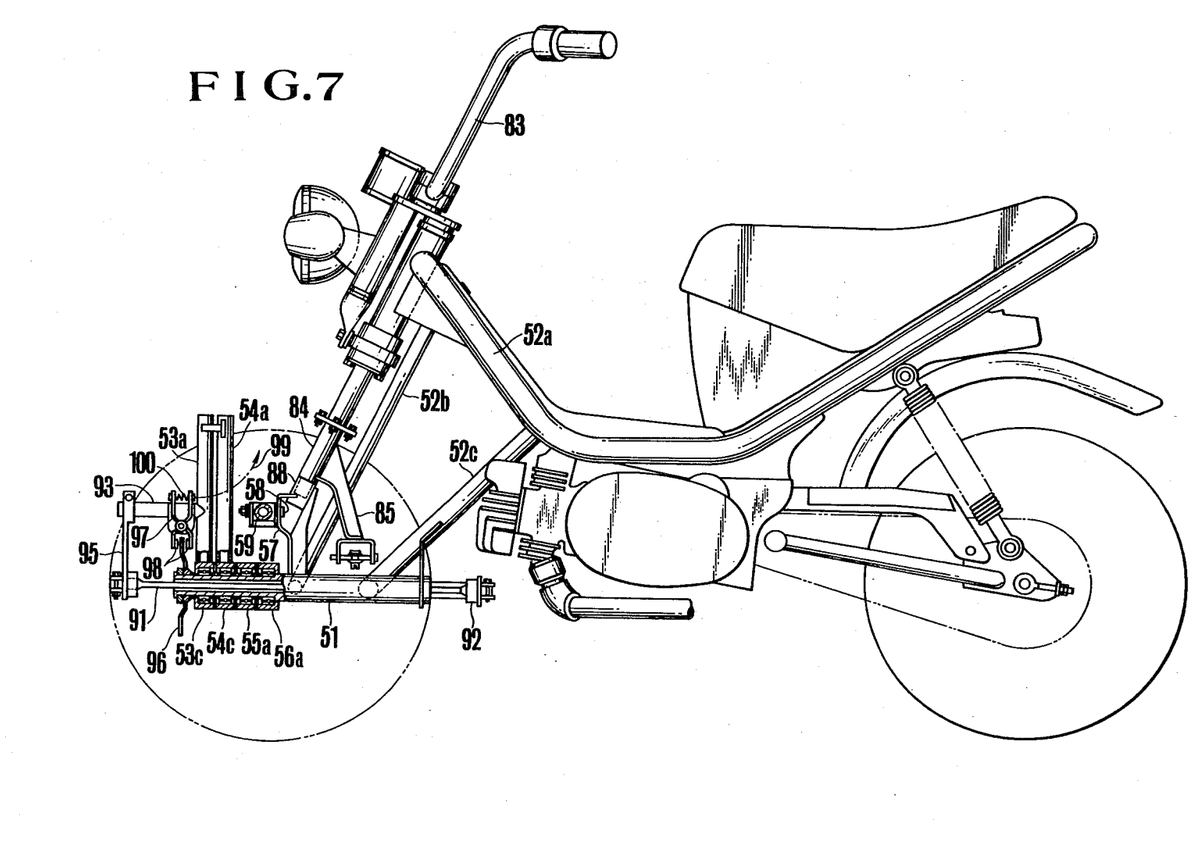
FIG. 7 is a side view, partly in section, showing a modified embodiment of this invention.
Figure 8:
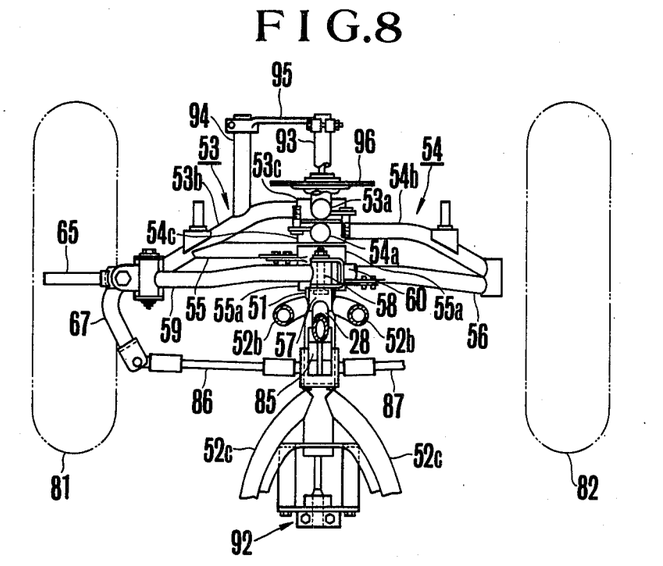
FIG. 8 is a plan view showing a modified suspension mechanism utilized in the modification shown in FIG. 7.
Figure 9:
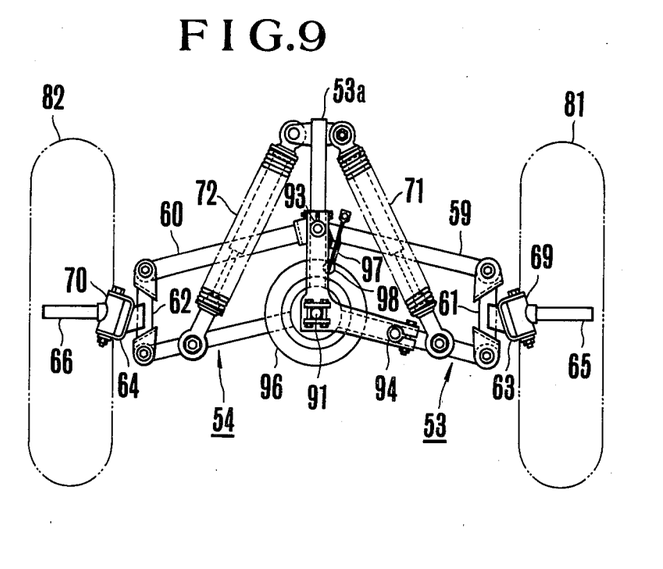
FIG. 9 is a front view of the mechanism shown in FIG. 8.
Figure 10:
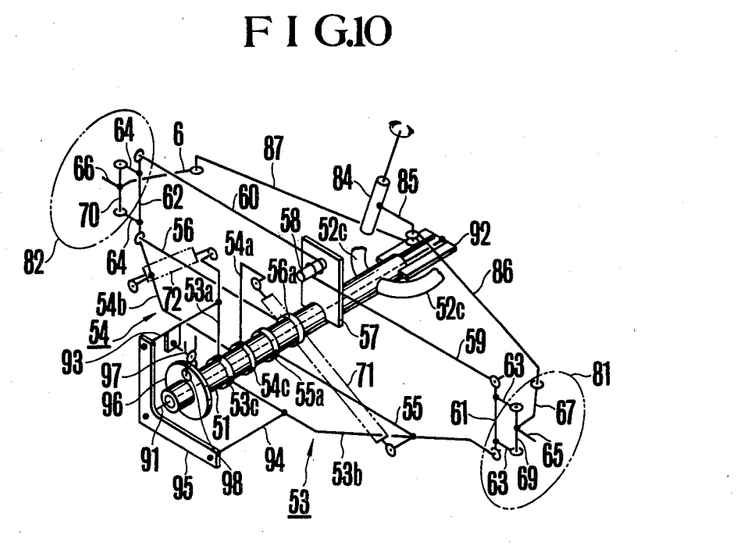
FIG. 10 is a diagrammatic representation of the suspension mechanism shown in FIGS. 7, 8 and 9.

When the tricycle turns along a curve as shown in FIG. 6, the driver makes the frame structure 12 incline towards the center of turning against centrifugal force and moves the center of gravity of the driver as well as the frame structure toward the center of the curve (to the right as viewed in FIG. 6). Under these conditions, since the pivoted ends of the upper arms 21 and 22, that is the pivot shaft 20, is moved towards the center of the curve, the links 23 and 24 also incline in the same direction as the frame structure 12. Accordingly, both fore wheels 40 and 41 incline in the same direction so that the resultant of the centrifugal force and the gravity acting on the center of gravity always acts in the direction to urge the fore wheels against the ground. The resultant force necessarily acts within an area defined by the supporting polygonal plane and will not depart from this area, this preventing the tricycle from falling down. For this reason, the lefthand wheel 40 located closer to the center of the curve would not float upwardly. By coinciding the direction of the resultant force with the direction of inclination of the frame structure 12 (to the right as viewed in FIG. 6) it is possible to realize a drive feeling substantially the same as that of a bicycle. Moreover, as the frame structure 12 inclines together with the fore wheels, a large camber thrust is produced which enables smooth turning in the same manner as a bicycle.

Since during standstill and low speed running, the vehicle is biased to the upright position by the resilient force of the torsion bar 48, the frame structure 12 is prevented from including largely to the right or the left. The steering is performed by rotating the handle post 43 by maneuvering the steering handle 42 so as to swing the steering arm 44 secured to the handle post 43 thereby rotating the knuckle arm 29 and 30 through tie rods 45 and 46.

As above described according to this invention, as the two fore wheels are supported by a double wishbone type suspension mechanism the fore wheels can move independently in the vertical direction and since the fore wheels incline as the vehicle body inclines, the resultant of the centrifugal force and the gravity acting on the center of gravity always acts in a direction to urge the fore wheel against the ground. Accordingly, it is possible to obtain a high turning stability as well as the same comfortable drive feeling as that of bicycle. In addition, since both fore wheels are resiliently supported by the inner and outer cylinders of the neidhart cushion and since the damping action of the resilient member of the neidhart cushion is utilized it is not necessary to provide any damper, and the construction is extremely compact and can drive easily and comfortably.

Various modifications may be made. For example, the righthand lower arm can be secured to the outer surface of the square portion 15a of the outer cylinder 15 and the lefthand lower arm 18 can be secured to the axial extending portion 14b of the inner cylinder 14. In addition, although the tricycle is generally provided with an internal combustion engine E as shown in FIG. 1, the various advantages of this invention can also be realized without such engine.

FIGS. 7 through 12 show a modified embodiment of this invention in which two fore wheels are mounted on the frame structure of the vehicle through a link mechanism and damper devices so as to ensure high stability not only when the tricycle runs straightly or turns about a curve.

This modified embodiment comprises a hollow shaft 51 connected to a main frame 52a which constitutes the frame structure 52 through stays 52b and 52c. The hollow shaft 51 is disposed at the axial center of the vehicle and L shaped arms 53 and 54 are pivotally connected to the hollow shaft 51. These arms comprises vertical levers 53a, 54a, horizontal levers 53b, 54b and ring shaped members 53c, 54c interconnecting these levers. Auxiliary arms 55 and 56 are connected to the L shaped arms 53 and 54 respectively and provided with ring shaped members 55a and 56a at one ends while their other ends are welded to the horizontal levers 53b and 54b respectively. Ring shaped members rotatably encircle the hollow shaft 51. A bracket 57 is connected to the frame structure through the hollow shaft 51 for rotatably supporting one ends of upper arms 59 and 60 by a pivot pin 58 which is secured to the bracket 57. Links 61 and 62 are provided for interconnecting the outer ends of the horizontal levers 53b and 54b of the L shaped arms 53 and 54 and the outer ends of the upper arms 59 and 60 respectively. These links 61 and 62 are moved in the vertical direction by the rotation of the ring shaped members 55c, 55a, 54c and 56a through horizontal levers 53b and 54b, and auxiliary arms 55 and 56. Knuckles 63 and 64 are secured to the links 61 and 62 respectively for rotatably supporting king pins 69 and 70 respectively having knuckle spindles 65 and 66 and fore wheel arms 67 and 68. Damper means 71 and 72 each constituted by a coil spring and an oil pressure damper (not shown) are connected between the left and righthand L shaped arms 54 and 53. More particularly, one damper means 71 is connected between the horizontal lever 53b of the L shaped arm 53 and the vertical lever 54a of the other L shaped arm 54, whereas the other damper means 72 is connected between the horizontal lever 54b of the L shaped arm 54 and the vertical lever 53a of the other L shaped arm 53.

Fore wheels 81 and 82 are steered by a steering handle 83 through a rotary handle post 84. A steering arm 85 is secured to the handle post 84 and connected to the fore wheel arms 67 and 68 through tie rods 67 and 68. The handle post 84 is rotatably supported by a bearing 88 which is secured to the frame structure 52 together with the bracket 57.

L shaped arms 53 and 54 are resiliently coupled to the frame structure 52 through members 91 through 99 and friction means to be described later for preventing the vibration of the frame structure at standstill and low speed running. These members comprise a steel torsion bar 91 with one end connected to the frame structure 52 through a fixture 92 secured to the rear end of the hollow shaft 51 and the other end connected to the vertical lever 53a and horizontal lever 53b of the L shaped arm 53 through connecting rods 93 and 94 and a crank arm 95 connected therebetween. A disc 96 is secured to the periphery of hollow shaft 51 and disposed to be clamped by pads 98 of a scissor shaped friction device 97 secured to the connecting rod 93. When a wire 99 (see FIG. 7) is pulled by operating a lever (not shown) which is provided for the steering handle or the like, the pads 98 of the friction device 97 are caused to clamp the disc 96 against the force of a compression spring 100 interposed between pad supporting levers whereby the L shaped arm 53 is secured to the frame structure.

Figure 11:
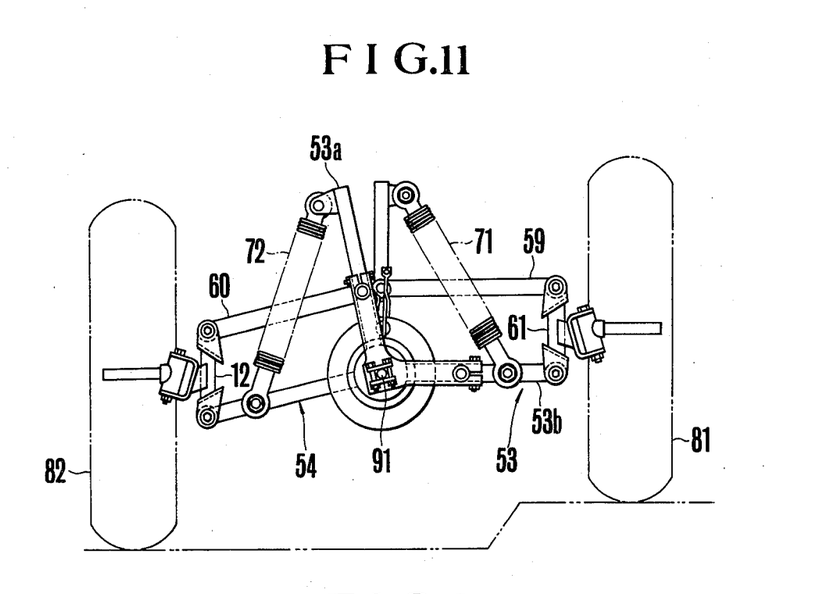
FIG. 11 is a front view useful to explain the operation of the modified embodiment when one of the fore wheels rides on a raised portion.
Figure 12:
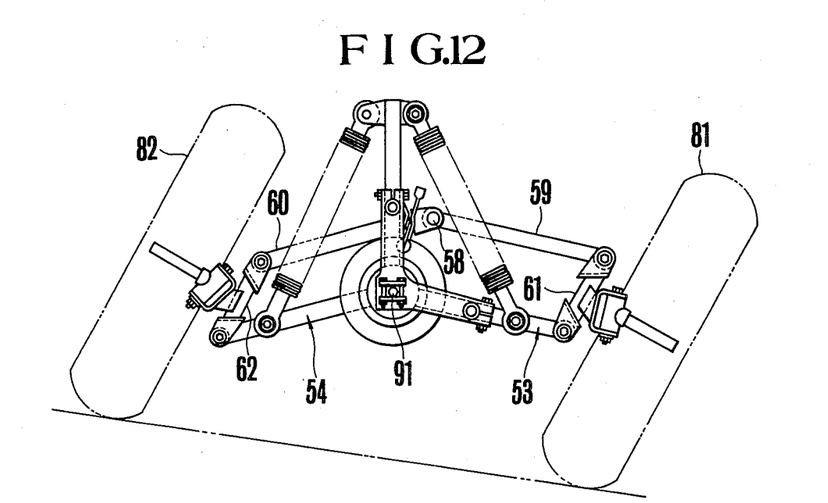
FIG. 12 is a front view useful to explain the operation of the modified embodiment when it turns around a curve.

When one fore wheel 81 rides on the high portion of the road as shown in FIG. 11, the L shaped arm 53 will rotate in the counterclockwise direction against the force of the torsion bar 91 and the damper means 71 and 72 thereby parallelly moving the links 61 and 62 in the vertical direction. As a consequence, the tricycle continues to run while maintaining upright both fore wheels 81 and 82 and the frame. Furthermore, when the tricycle turns along a curve, the driver moves his center of gravity toward the center of the curve so as to incline the frame structure also toward the center of the curve that is to the right against the force of the torsion bar 91 as shown in FIG. 12. Then, the pivot pin 58 of the upper arms 59 and 60 moves to the right thus inclining links 61 and 62 in the same direction. Accordingly, the resultant of the centrifugal force and the gravity which act on the center of gravity always acts to urge the fore wheels against the ground these preventing the floating up of the fore wheels. In addition, the spring force of the torsion bar 91 prevents the righthand fore wheel 81 from floating upwardly. Moreover, as the fore wheels incline together with the frame structure, a large camber thrust is created to enable smooth turning like a bicycle.

During standstill or low speed running the driver clamps the disc 96 between the pads 98 by operating the friction device so as to fixedly connect the L shaped lower arm 53 to the frame structure through the hollow shaft 51 and the disc 96, whereby the transverse vibration of the frame structure can be efficiently prevented. The steering of the vehicle is performed by rotating the handle post 84 by the manipulation of the handle 83 so as to swing the steering arm 85 thereby rotating the king pins 69 and 70 through tie rods 68 and 87.

In this embodiment too, both fore wheels are suspended from the vehicle body through a link mechanism and damper means so that the fore wheel can not only move independently in the vertical direction but also incline together with the vehicle body. Consequently, the stability of the vehicle at the time of turning is greatly improved. Thus, the invention is suitable for tricycles having relatively small distane between fore wheels.

Various changes and modifications are possible. For example, it is possible to secure one end of the torsion bar 91 to L-shaped arm 54 through a connecting rod and crank lever 95.

What is claimed is:
1. A tricycle comprising:
a main frame;
a torsion bar extending longitudinally at the forward portion of said main frame, one end of said torsion bar being connected to said main frame;
a neidhart cushion means having a longitudinally-extending axis of rotation, rotatably mounted on said main frame, said neidhart cushion means including an inner cylinder, an outer cylinder and resilient means positioned between said inner and outer cylinders for limiting relative rotation therebetween, one of said cylinders being connected to the other end of said torsion bar;

a lower lefthand arm having an inner end connected to one of said cylinders;

a lower righthand arm having an inner end connected to the other of said cylinders;

a righthand link having a lower end pivotally connected to the outer end of said lower righthand arm;

a lefthand link having a lower end pivotally connected to the outer end of said lower lefthand arm;

an upper lefthand arm having an outer end pivotally connected to the upper end of said lefthand link;

an upper righthand arm having an outer end pivotally connected to the upper end of said righthand link;

inner ends of said upper arms being pivotally connected to said main frame; and means for supporting a front wheel on each of said links, respectively.

2. A tricycle according to claim 1 further including two knuckles each provided between one of said fore wheels and one of said links corresponding thereto so that when the tricycle turns about a curve, said fore wheels incline towards the center of the curve.

3. A tricycle according to claim 2 wherein said tricycle further comprises a steering handle, a steering arm provided at a lower end of said steering handle, tie rods connected to said steering arm, and knuckle arms pivotally connected to said tie rods and to the knuckles respectively.

4. A tricycle according to claim 1 wherein said inner cylinder comprises a substantially square portion and an axially extending portion integral therewith while said outer cylinder comprises a square portion encircling the square portion of said inner cylinder and an integral flange, the inner end of one of said lower arms being secured to the axially extending portion, the inner end of the remaining lower arm being secured to the outer wall of the square portion of said outer cylinder, the other end of the torsion bar being secured to the flange of the outer cylinder through a coupling member secured thereto.

5. A tricycle according to claim 1, further including a hollow shaft comprising a portion of said frame mounting said neidhart cushion means, and having said torsion bar extending therethrough.

6. A tricycle according to claim 5 further including two knuckles each provided between one of said fore wheels and one of said links corresponding thereto so that when the tricycle turns about a curve, said fore wheels incline towards the center of the curve.

7. A tricycle according to claim 6 wherein said tricycle further comprises a steering handle, a steering arm provided at a lower end of said steering handle tie rods connected to said steering arm, and knuckle arms pivotally connected to said tie rods and to the knuckles respectively.

8. A tricycle according to claim 5 wherein said inner cylinder comprises a substantially square portion and an axially extending portion integral therewith while said outer cylinder comprises a square portion encircling the square portion of said inner cylinder and an integral flange, the inner end of one of said lower arms being secured to the axially extending portion the inner end of the remaining lower arm being secured to the outer wall of the square portion of said outer cylinder, the other end of the torsion bar being secured to the flange of the outer cylinder through a coupling member secured thereto.

* * * * *